United States Patent [19]
Hayasaki et al.

[11] Patent Number: 6,146,551
[45] Date of Patent: Nov. 14, 2000

[54] SEMICONDUCTIVE CERAMICS AND SUPPORTING MEMBER MADE OF THE SAME FOR SUPPORTING MAGNETIC DISK SUBSTRATE

[75] Inventors: Tetsuji Hayasaki, Hayato-cho; Masahiro Okumura, Yasu-cho, both of Japan

[73] Assignee: Kyocera Corporation, Kyoto, Japan

[21] Appl. No.: 09/322,140

[22] Filed: May 28, 1999

[30]     Foreign Application Priority Data

May 29, 1998  [JP]  Japan ................................. 10-150445

[51] Int. Cl.⁷ ..................................................... H01B 1/06
[52] U.S. Cl. .................................... 252/518.1; 252/519.5; 252/519.54; 252/521.2; 252/521.3; 252/521.5; 252/500; 360/97.01; 360/98; 360/135
[58] Field of Search ................................ 252/500, 519.5, 252/519.54, 521.2, 521.3, 521.5, 518.1, 509; 360/98, 97.01, 135

[56]     References Cited

U.S. PATENT DOCUMENTS 5,464,480  11/1995  Matthews ................................. 134/1.3
5,969,902  10/1999  Okumura et al. ..................... 360/99.08

*Primary Examiner*—Yogendra Gupta
*Assistant Examiner*—Derrick G. Hamlin
*Attorney, Agent, or Firm*—Hogan & Hartson, LLP

[57]     ABSTRACT

A semiconductive ceramic contains a compound of MgO and $SiO_2$ as a main component, and an iron oxide such as FeO, $Fe_2O_3$, and $Fe_3O_4$ as an electric conductivity provider. According to necessity, the semiconductive ceramic further contains at least one of zinc oxide, niobium oxide, and chromium oxide as an electric conductivity provider. The semiconductive ceramic has a desired electric conductivity and a mechanical strength required for structural material, thus being usable in various applications.

7 Claims, 1 Drawing Sheet

SEMICONDUCTIVE CERAMICS AND SUPPORTING MEMBER MADE OF THE SAME FOR SUPPORTING MAGNETIC DISK SUBSTRATE

This application is based on patent application Nos. 9-360095 and 10-150445 filed in Japan, the contents of which is hereby incorporated by reference.

BACKGROUND OF THE INVENTION

This invention relates to semiconductive ceramics for use in ceramic heaters, ceramic sensors, resistor substrates and the like, and a supporting member for supporting a magnetic disk substrate.

In general, ceramics is an insulating material. Recently, however, there have been marketed semiconductive ceramics having the property of semiconductivity. Silicon carbide ceramics or Perovskite ceramics, such as lanthanum chromite, have been conventionally used as semiconductive ceramics for use in ceramic heaters, ceramic sensors or the like.

Also, there have been proposed semiconductive structural ceramics in which conductive material, such as metal oxides, metal nitrides, or metal carbides, is added in a conventional structural ceramics. For example, Japanese Unexamined Patent Publications Nos. (HEI) 2-295009 and 1-243388 respectively disclose alumina semiconductive ceramics and zirconia semiconductive seramics which are obtained by mixing $TiO_2$, TiC, NiO, or CoO as conductive material with alumina material or zircona material, and sintering the mixture in a reducing condition.

Further, there have been recently proposed use of a semiconductive ceramics as a supporting member for supporting a magnetic disk substrate in a magnetic disk unit.

As shown in FIG. 1, specifically, a magnetic disk unit 50, which is used as an external storage means of a computer, comprises a hub 14 fixedly attached to a rotary shaft 13, and magnetic disk substrates 15 placed on the periphery of the hub 14, and ring-shaped spacers 11 placed on the periphery of the hub 14. The spacers 11 are placed between the magnetic disk substrates 15. Further, the magnetic disk substrates 15 and the spacers 11 are pressed with a ring-shaped shim 10 and a cramp 12, and tightly fastened on the hub 14 by screws 16. Indicated at 17 are magnetic heads.

The rotary shaft 13 is rotated by a driver. The magnetic disk substrates 15 rotates together with the rotation of the rotary shaft 13 without coming into contact with the magnetic heads 17 so that information is written and read at a specified position of a magnetic disk substrate 15.

The magnetic disk unit 50 has been demanded to store a large amount of information at a higher density. Accordingly, it is required to make the distance between the magnetic head 17 and the magnetic disk substrate 15 shorter, and increase the flatness and the smoothness of the magnetic disk substrate 15. For this reason, the magnetic disk substrate 15 has been proposed to be made of glass material because the glass material makes it possible to ensure a higher surface flatness and smoothness. In this case, the supporting member for supporting the magnetic disk substrate 15, that is, the spacer 11, the shim 10, and the clamp 12, are made of ceramics or glass in order to prevent the magnetic disk substrate 15 from deforming due to a difference in thermal expansion between the magnetic disk substrate 15 and the supporting member. Japanese Examined Patent Publication No. (HEI) 5-80745 and Japanese Unexamined Patent Publication No. (SHO) 61-148667 disclose such a technique.

However, the conventional supporting member is made of insulating glass or ceramics. Recently, it has been revealed that the magnetic disk substrate 15 held by the supporting member made of insulating ceramics or glass has an electric charge, consequently causing damages in the writing and reading of information on the magnetic disk substrate 15. To solve this problem, a film of metal such as aluminum or zinc has been proposed to be coated in the surface area of the supporting member that comes into contact with the magnetic disk substrate 15 to ground the electric charge.

However, the provision of the metal film decrease the flatness of the contact surface of the supporting member, consequently causing a strain in the magnetic disk substrate 15, and further a likelihood that the magnetic head 17 comes into contact with the magnetic disk substrate 15 to damage it. In addition, there is a likelihood that the metallic film peels off from the supporting member due to a thermal expansion difference relative to the glass or ceramics supporting member, then cutting off the grounding of electric charge in the magnetic disk substrate 15.

In view of these problems, Japanese Unexamined Patent Publication No. (HEI) 2-226566 proposes a technique of making a supporting member of semiconductive ceramics to prevent electric charge from accumulating in the magnetic disk substrate 15.

In the field of jigs and tools for assembly of electronic parts, further, the electric conductivity has been required to prevent accumulation of electric charge in addition to the property of high abrasion resistance and corrosion resistance. In view thereof, the jig or tool is considered to be made of semiconductive ceramics.

However, it has been difficult to produce the above-mentioned semiconductive ceramics at low costs. For example, silicon carbide ceramics is a difficult-to-sinter material. Specifically, silicon carbide ceramics is required to be sintered at 2000° C. or more in a non-oxidizing condition. In addition, the hot pressing and the hot isostatic pressing are required. As a result, the cost is high but the productivity is low.

Also, perovskite ceramics may be sintered in an oxidizing condition. However, the unit price of raw material is high. Further, perovskite ceramics generally has a bending strength less than 100 MPa, which is too low to be used as a structural material.

In production of alumina or zirconia semiconductive ceramics containing NiO, CoO or the like as a conductive provider, the hot pressing and the hot isostatic pressing are required. Further, after sintering in an oxidizing condition, another sintering is required to be conducted in a reducing condition. Such complicated production manner lowers the productivity, and makes the production control difficult. The requirement of two sinterings considerably increases the production costs.

Further, in the case of a supporting member made of the above-mentioned semiconductive ceramics, a thermal expansion difference of $2 \times 10^{-6}/°$ C. to $5 \times 10^{-6}/°$ C. occurs between the supporting member and the magnetic disk substrate 15 made of glass. Such thermal expansion difference causes a strain in the magnetic disk substrates 15, and impairs the parallelism between the magnetic disk substrates 15.

Further, as material for jigs and tools capable of removing electric charges and preventing excessive current due to electric charge, an electric conductivity of $10^5$ Ω·cm to $10^{11}$ Ω·cm in terms of volume specific resistance is required. However, alumina semiconductive ceramics added with TiO$_2$ or TiC cannot have an electric conductivity greater than $10^{-2}$ Ω·cm in terms of volume specific resistance. Accordingly, alumina semiconductive ceramics are not suitable for electric charge preventive jig or tool.

SUMMARY OF THE INVENTION

It is an object of the present invention to provide semiconductive ceramics, and a supporting member for supporting a magnetic disk substrate which have overcome the problems residing in the prior art.

According to an aspect of the present invention, a semiconductive ceramic comprises 80 to 93 weight percent of a compound of MgO and SiO$_2$, and 7 to 20 weight percent of an iron oxide, and having an electric conductivity of $10^7$ Ω·cm or more but less than $10^{12}$ Ω·cm in terms of volume specific resistance.

According to another aspect of the present invention, a supporting member for supporting a magnetic disk substrate at a specified position is made of a semiconductive ceramic comprising 80 to 93 weight percent of a compound of MgO and SiO$_2$, and 7 to 20 weight percent of an iron oxide, and having an electric conductivity of $10^7$ Ω·cm or more but less than $10^{12}$ Ω·cm in terms of volume specific resistance.

According to still another aspect of the present invention, a semiconductive ceramic comprises a compound of MgO and SiO$_2$ as a main component, an iron oxide, and at least one selected from the group consisting of a zinc oxide, a niobium oxide, and a chromium oxide, and having a three-point bending strength of 100 MPa or more and a thermal expansion coefficient of $11 \times 10^{-6}/°$ C. or less.

According to still yet another aspect of the present invention, a supporting member for supporting a magnetic disk substrate at a specified position is made of a semiconductive ceramic comprising a compound of MgO and SiO$_2$ as a main component, an iron oxide, and at least one selected from the group consisting of a zinc oxide, a niobium oxide, and a chromium oxide, and having a three-point bending strength of 100 MPa or more and a thermal expansion coefficient of $11 \times 10^{-6}/°$ C. or less.

These and other objects, features and advantages of the invention will become more apparent upon reading the following detailed description.

DETAILED DESCRIPTION OF THE PREFERRED EMBODIMENT OF THE INVENTION

Figure 1:
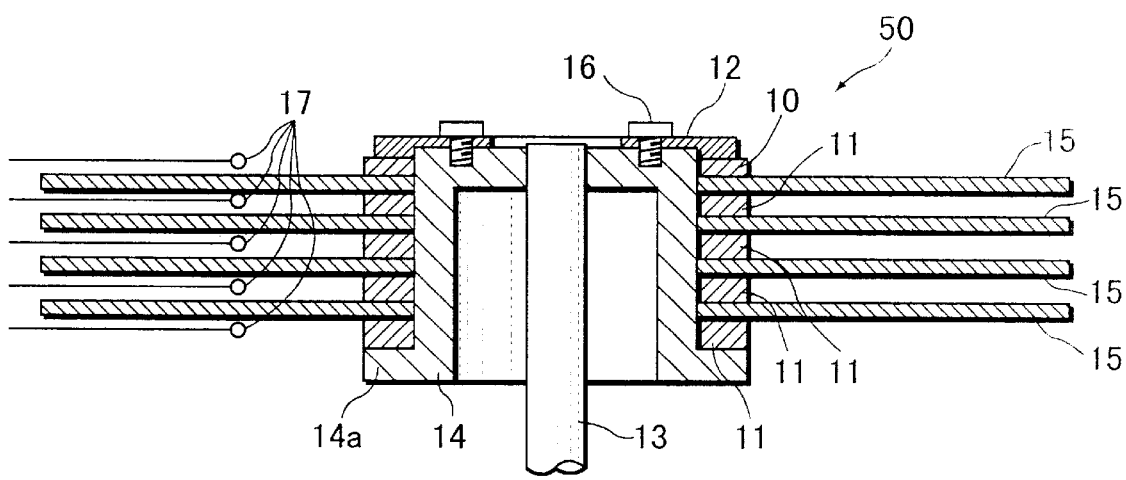
FIG. 1 is a cross sectional view showing a construction of a conventional magnetic disk unit.

Semiconductive ceramics according to the invention includes a compound of MgO and SiO$_2$. The compound oxide mainly includes Mg$_2$SiO$_4$ (forsterite) and/or MgSiO$_3$ (steatite) in a sintered state. Ceramics consisting of Mg$_2$SiO$_4$ (forsterite) and/or MgSiO$_3$ (steatite) has the insulating property and a bending strength of around 150 MPa. Inventors of the present invention have found that an iron oxide (e.g., FeO, Fe$_2$O$_3$, and/or Fe$_3$O$_4$) is added into ceramics mainly including Mg$_2$SiO$_4$ to impart the electric conductivity to the ceramics, and to finally produce semiconductive ceramics having an electric conductivity of $10^7$ Ω·cm or more but less than $10^{12}$ Ω·cm in terms of volume specific resistance by controlling their respective contents. This semiconductive ceramics will be referred to as "first semiconductive ceramics".

Further, the inventors have found that zinc oxide (e.g., ZnO), niobium oxide (e.g., NbO, Nb$_2$O$_3$ and/or Nb$_2$O$_5$), and/or chromium oxide (e.g., CrO$_2$ and/or Cr$_2$O$_3$) is added into ceramics mainly including Mg$_2$SiO$_4$ in addition to the above-mentioned iron oxide to impart a desired strength and thermal expansion coefficient to the ceramics, and to finally produce semiconductive ceramics having a three-point bending strength of 100 MPa or more and a thermal expansion coefficient of $11 \times 10^{-6}/°$ C. or less. This semiconductive ceramics will be referred to as "second semiconductive ceramics".

The first semiconductive ceramics contains a compound of MgO and SiO$_2$ as a main component, and an iron oxide (e.g., FeO, Fe$_2$O$_3$ and/or Fe$_3$O$_4$). The iron oxide, which is added as an electric conductivity provider, has an electric conductivity of around $10^{-2}$ Ω·cm in terms of volume specific resistance at a room temperature. Semiconductive ceramics having an electric conductivity of $10^7$ Ω·cm or more but less than $10^{12}$ Ω·cm in terms of volume specific resistance is produced by adjusting the content of the iron oxide. The semiconductive ceramics has a three-point bending strength of 100 MPa or more. Further, semiconductive ceramics having a three-point bending strength of 140 MPa or more can be produced by adjusting the content of the iron oxide more finely.

The second semiconductive ceramics contains a compound of MgO and SiO$_2$ as a main component, the iron oxide, and at least one selected from the group consisting of zinc oxide, niobium oxide, and chromium oxide.

Zinc oxide (e.g, ZnO), niobium oxide (e.g., NbO, Nb$_2$O$_3$ and/or Nb$_2$O$_5$), and chromium oxide (e.g., CrO$_2$ and/or Cr$_2$O$_3$) have the following function in the second semiconductive ceramics. Zinc oxide (e.g., ZnO) does not provide a desired electric conductivity at a room temperature, but forms a grain boundary phase, thereby contributing to the electric conductivity attained by the other electric conductivity providers. Niobium oxide (e.g., NbO, Nb$_2$O$_3$ and/or Nb$_2$O$_5$) has an electric conductivity of $10^{-1}$ to $10^{-2}$ Ω·cm in terms of volume specific resistance at a room temperature. Chromium oxide (e.g., CrO$_2$ and/or Cr$_2$O$_3$) has an electric conductivity of $10^{-1}$ to $10^7$ Ω·cm in terms of volume specific resistance at a room temperature. The content of zinc oxide, niobium oxide, and chromium oxide is adjusted to produce semiconductive ceramics having a three-point bending strength of 100 MPa or more and a thermal expansion coefficient of $11 \times 10^{-6}/°$ C. or less. This semiconductive ceramics can have an electric conductivity of $10^5$ Ω·cm or more but less than $10^8$ Ω·cm in terms of volume specific resistance by adjusting the content of zinc oxide, nibium oxide, and chromium oxide more finely.

Specifically, the first semiconductive ceramics is produced as follows. A compound of MgO and SiO$_2$, such as Mg$_2$SiO$_4$, MgSiO$_3$, is prepared. Also, an iron oxide, such as FeO, Fe$_2$O$_3$, or Fe$_3$O$_4$, is prepared as an electric conductivity provider. The iron oxide is mixed with the compound oxide. The content of the compound oxide is 80 to 93 weight percent of the mixture while the content of the iron oxide is 7 to 20 weight percent of the mixture.

The above-mentioned contents are determined for the following reasons. If the content of the iron oxide is less than 7 weight percent, the electric conductivity of $10^7$ Ω·cm or more but less than $10^{12}$ Ω·cm in terms of volume specific resistance cannot be attained. On the other hand, if the content of the iron oxide is more than 20 weight percent, the density of the sintered ceramics becomes too low, and the mechanical strength considerably falls. The three-point bending strength does not reach 100 MPa. Accordingly, the ceramics cannot be used as a structural material.

It is preferable to render the content of the compound of MgO and $SiO_2$ 85 to 93 weight percent and the content of the iron oxide 7 to 15 weight percent to produce semiconductive ceramics having more mechanical strength or a three-point bending strength of 140 MPa or more.

The semiconductive ceramics may contain an impurity, such as $Al_2O_3$, CaO, TiO, BaO, in the range of 1 weight percent or less.

It is more preferable that the semiconductive ceramics has crystals of $2MgO \cdot SiO_2$ and/or $MgSiO_3$, and crystals of at least one of $MgFe_2O_3$, $MgFe_2O_4$, $Fe_2O_3$, and $Fe_3O_4$. The crystals of $MgFe_2O_3$, $MgFe_2O_4$, $Fe_2O_3$, or $Fe_3O_4$ is advantageous in the aspect of prepeding the electric conductivity.

The second semiconductive ceramics is produced as follows. A compound of MgO and $SiO_2$, such as $Mg_2SiO_4$, $MgSiO_3$, is prepared. Also, an iron oxide, such as FeO, $Fe_2O_3$, or $Fe_3O_4$, and at least one of zinc oxide such as ZnO, niobium oxide such as NbO, $Nb_2O_3$, $Nb_2O_5$, and chromium oxide such as $CrO_2$, $Cr_2O_3$ are prepared as an electric conductivity provider. They are mixed with one another in the following proportion. The content of the compound of MgO and $SiO_2$ is 42 to 90 weight percent of the mixture, the content of the iron oxide (FeO, $Fe_2O_3$, and/or $Fe_3O_4$) is 5 to 55 weight percent of the mixture, and the content of at least one of zinc oxide (ZnO), niobium oxide (NbO, $Nb_2O_3$, $Nb_2O5$), and chromium oxide ($CrO_2$, $Cr_2O_3$) is 3 to 53 weight percent of the mixture.

The above-mentioned contents are determined for the following reasons. If the content of the compound oxide is less than 42 weight percent, the three-point bending strength of 100 Mpa or more cannot be attained. On the other hand, if the compound oxide exceeds 90 weight percent, a desired electric conductivity, specifically $10^5$ $\Omega \cdot cm$ or more but less than $10^8$ $\Omega \cdot cm$ in terms of volume specific resistance, cannot be attained.

Regarding the content of the iron oxide, if the content of the iron oxide is less than 5 weight percent, the desired electric conductivity of $10^5$ $\Omega \cdot cm$ or more but less than $10^8$ $\Omega \cdot cm$ in terms of volume specific resistance cannot be attained. If the content of the iron oxide exceeds 55 weight percent, the three-point bending strength does not reach 100 MPa.

Further, the second semiconductive ceramics may contain tin oxide, copper oxide, cobalt oxide or the like. Furthermore, the semiconductive ceramics may contain impurity, such as $Al_2O_3$, CaO, $TiO_2$, in the range of 0.1 weight percent of the mixture.

It is preferable that the second semiconductive ceramics has crystals of $2MgO \cdot SiO_2$ and/or $MgSiO_3$, crystals of at least one of $MgFe_2O_3$, $MgFe_2O_4$, $Fe_2O_3$, and $Fe_3O_4$, and crystals of at least one of ZnO, $FeZnO_4$, $FeNbO_4$, $MgNb_2O_6$, $MgCr_2O_4$, $CrO_2$ and $Cr_2O_3$.

The above-mentioned mixture is formed into a specified shape, and sintered for 1 to 2 hours at 1200 to 1300° C. in the atmospheric condition to produce the inventive semiconductive ceramics.

As described above, the inventive semiconductive ceramics can be sintered in the atmospheric condition without any special process or conditions. This will simplify the production process, and thus ensure the low-cost production. However, the inventive semiconductive ceramics may be sintered in a non-oxidizing condition or a reducing condition.

Also, the inventive semiconductive ceramics has an electric conductivity of $10^7$ $\Omega \cdot cm$ or more but less than $10^{12}$ $\Omega \cdot cm$ in terms of volume specific resistance, or $10^5$ $\Omega \cdot cm$ or more but less than $10^8$ $\Omega \cdot cm$ in terms of volume specific resistance, and is advantageous in removing electric charges. Accordingly, the inventive semiconductive ceramics is usable in various applications.

For example, it could be appreciated to use the inventive semiconductive ceramics in a handling jigs or tools such as tweezers for use in production site of magnetic recording device and other electronic components. Specifically, a jig or tool is entirely made of the inventive semiconductive ceramics, or is attached with a layer of the inventive semiconductive ceramics on the surface of the jig or tool that comes into contact with a work. Thus-made jig or tool can remove electric charges.

Also, it could be appreciated that a supporting member, such as spacer, shim, hub, for supporting magnetic disk substrate is made of the inventive semiconductive ceramics. Such supporting member can prevent electric charges from accumulating in the magnetic disk substrate. Also, the inventive semiconductive ceramics has a smaller thermal expansion difference in relative to the magnetic disk substrates made of glass, therefore causing little strain or deformation in the magnetic disk substrate.

Further, it could be appreciated to use the inventive semiconductive ceramics for a guide member for guiding a running magnetic tape, or a electrodeposition nozzle for coating automobiles as an electric charge remover. Furthermore, it could be appreciated to use the inventive semiconductive ceramics for a ceramics heater, a ceramics sensor, or a resistance measurement probe for semiconductor and thin film production.

Moreover, the inventors have conducted further study on the second semiconductive ceramics, and have found that the second semiconductive ceramics can be colored into a desired color by adjusting the proportion of components.

(I) Brown-colored semiconductive ceramics is produced by mixing 42 to 90 weight percent of a compound of MgO and $SiO_2$, 5 to 20 weight percent of the iron oxide, and zinc oxide and/or chromium oxide as the remainder. In the case of containing not zinc oxide but chromium oxide only as the remainder, the content of chromium oxide should be more than 15 weight percent to produce a color of brown.

(II) Brown-colored semiconductive ceramics is also produced by mixing 42 to 90 weight percent of a compound of MgO and $SiO_2$, 5 to 20 weight percent of the iron oxide, 5 weight percent or more but less than 10 weight percent of niobium oxide, and zinc oxide and/or chromium oxide as the remainder. If the content of niobium oxide is less than 5 weight percent, the electric conductivity of the ceramics exceeds $10^8$ $\Omega \cdot cm$ in terms of volume specific resistance. On the other hand, if the content of niobium oxide is 10 weight percent or more, a color of brown cannot be obtained even the addition of zinc oxide or chromium oxide.

(III) Gray-colored semiconductive ceramics is produced by mixing 42 to 90 weight percent of a compound of MgO and $SiO_2$, 5 to 20 weight percent of the iron oxide, and niobium oxide or chromium oxide as the remainder. In the case of containing not niobium oxide but chromium oxide only as the remainder, the content of chromium oxide should be 15 weight percent or less to produce a color of gray.

(IV) Gray-colored semiconductive ceramics is also produced by mixing 42 to 90 weight percent of a compound of MgO and $SiO_2$, 5 to 20 weight percent of the iron oxide, 10 or more but less than 38 weight percent of niobium oxide, and zinc oxide and/or chromium oxide as the remainder. If the content of niobium oxide is less than 10 weight percent, a color of gray cannot be obtained even the addition of zinc oxide or chromium oxide. On the other hand, if the content of niobium oxide is 38 weight percent or more, a sufficient mechanical strength cannot be attained because the content of the compound oxide becomes too low.

The upper limit for the iron oxide content is determined to be 20 weight percent for the following reason. A mixture of the compound oxide and the iron oxide usually has the color of black. However, the addition of zinc oxide, chromium oxide, niobium oxide can produce a color of brown or gray as far as the content of the iron oxide is kept in 20 weight percent or less. In the case of the content of the iron oxide being more than 20 weight percent, the color of black remains unchanged even if adding zinc oxide, chromium oxide, or niobium oxide.

Next, the present invention will be further described in detail with reference to examples. However, it is to be noted that the present invention is not limited to the examples, but various changes and modifications will be apparent to those skilled in the art. Therefore, unless otherwise such change and modifications depart from the scope of the invention, they should be construed as being included therein.

EXAMPLE 1

Sample No. 1 was prepared by the following steps. A compound of MgO and $SiO_2$ was prepared as a starting material, and $Fe_2O_3$ was prepared as an electric conductivity provider. They were mixed with each other in the proportion shown in Table 1. The mixture was placed in a specified chamber together with water or organic solvent and a binder, and was mixed for about 1 hour to obtain slurry. The slurry was dried with a spray dryer to prepare a secondary raw material in the form of a ball. The ball-shaped secondary raw material was compacted into a predetermined shape under a molding pressure of 1.0 ton/cm² by dry pressing, and then, was sintered for about 2 hours at 1200 to 1300° C. in the atmospheric condition. As a result, semiconductive ceramics was obtained. The semiconductive ceramics was ground into a size of 60 mm in diameter and 2 mm in thickness. Consequently, Sample No. 1 was obtained.

Sample Nos. 2 to 7 were prepared in the same manner as Sample No. 1, except that the respective contents of the compound oxide and the iron oxide were changed as shown in Table 1.

The volume specific resistance and the three-point bending strength of each sample were measured. Samples which had an electric conductivity of $10^7$ Ω·cm or more but less than $10^{12}$ Ω·cm in terms of volume specific resistance and a three-point bending strength of 100 MPa or more were evaluated to be good. Results of these samples are shown in Table 2.

Similarly, Sample Nos. 8 to 13 containing a compound of MgO and $SiO_2$ and FeO as an electric conductivity provider were prepared as shown in Table 3. Their volume specific resistance and three-point bending strengths were measured, and shown in Table 4.

Further, Sample Nos. 14 to 19 containing a compound of MgO and $SiO_2$ and $Fe_3O_4$ as an electric conductivity provider were prepared as shown in Table 5. Their volume specific resistance and three-point bending strengths were measured, and shown in Table 6.

TABLE 1

| | Content (weight %) | | Sintering Conditions | |
|---|---|---|---|---|
| No. | MgO.SiO₂ | Fe₂O₃ | Temperature (° C.) | Hours |
| 1* | 75 | 25 | 1250 | 2 |
| 2 | 80 | 20 | 1210 | 2 |
| 3 | 85 | 15 | 1300 | 2 |
| 4 | 90 | 10 | 1300 | 2 |
| 5 | 93 | 7 | 1300 | 2 |
| 6* | 94 | 6 | 1300 | 2 |
| 7* | 99 | 1 | 1300 | 2 |

The *-added sample has a value outside the inventive range.

TABLE 2

| No. | Porosity (%) | Volume Specific Resistance (Ω · cm) | Bending Strength (MPa) |
|---|---|---|---|
| 1* | 0 | $1 \times 10^5$ | 130 |
| 2 | 0 | $1 \times 10^7$ | 130 |
| 3 | 0 | $2 \times 10^7$ | 150 |
| 4 | 0 | $1 \times 10^{11}$ | 150 |
| 5 | 0 | $4 \times 10^{11}$ | 150 |
| 6* | 0 | $5 \times 10^{12}$ | 150 |
| 7* | 0 | $>10^{13}$ | 150 |

The *-added sample has a value outside the inventive range.

TABLE 3

| | Content (weight %) | | Sintering Conditions | |
|---|---|---|---|---|
| No. | MgO.SiO₂ | FeO | Temperature (° C.) | Hours |
| 8* | 75 | 25 | 1250 | 2 |
| 9 | 80 | 20 | 1200 | 2 |
| 10 | 85 | 15 | 1300 | 2 |
| 11 | 90 | 10 | 1300 | 2 |
| 12 | 93 | 7 | 1300 | 2 |
| 13* | 94 | 6 | 1300 | 2 |

The *-added sample has a value outside the inventive range.

TABLE 4

| No. | Porosity (%) | Volume Specific Resistance (Ω · cm) | Bending Strength (MPa) |
|---|---|---|---|
| 8* | 0 | $1 \times 10^5$ | 130 |
| 9 | 0 | $1 \times 10^7$ | 130 |
| 10 | 0 | $5 \times 10^7$ | 150 |
| 11 | 0 | $1 \times 10^{11}$ | 150 |
| 12 | 0 | $4 \times 10^{11}$ | 150 |
| 13* | 0 | $5 \times 10^{12}$ | 150 |

The *-added sample has a value outside the inventive range.

TABLE 5

| | Content (weight %) | | Sintering Conditions | |
|---|---|---|---|---|
| No. | MgO.SiO₂ | Fe₃O₄ | Temperature (° C.) | Hours |
| 14* | 75 | 25 | 1250 | 2 |
| 15 | 80 | 20 | 1200 | 2 |
| 16 | 85 | 15 | 1300 | 2 |
| 17 | 90 | 10 | 1300 | 2 |

TABLE 5-continued

| No. | Content (weight %) | | Sintering Conditions | |
|---|---|---|---|---|
| | $MgO \cdot SiO_2$ | $Fe_3O_4$ | Temperature (° C.) | Hours |
| 18 | 93 | 7 | 1300 | 2 |
| 19* | 94 | 6 | 1300 | 2 |

The *-added sample has a value outside the inventive range.

TABLE 6

| No. | Porosity (%) | Volume Specific Resistance ($\Omega \cdot cm$) | Bending Strength (MPa) |
|---|---|---|---|
| 14* | 0 | $1 \times 10^6$ | 130 |
| 15 | 0 | $2 \times 10^7$ | 130 |
| 16 | 0 | $1 \times 10^8$ | 150 |
| 17 | 0 | $1 \times 10^{11}$ | 150 |
| 18 | 0 | $4 \times 10^{11}$ | 150 |
| 19* | 0 | $5 \times 10^{12}$ | 150 |

The *-added sample has a value outside the inventive range.

It could be seen in Tables 1 and 2 that Sample No. 1 containing a large amount of $Fe_2O_3$, i.e., 25 weight percent, had some electric conductivity, i.e., $1 \times 10^5$ $\Omega \cdot cm$ in terms of volume specific resistance, which is short of the desired lower limit electric conductivity, i.e., $1 \times 10^7$ $\Omega \cdot cm$ in terms of volume specific resistance. Sample No. 6 containing 94 weight percent of the compound oxide and 6 weight percent of the iron oxide ($Fe_2O_3$) had a three-point bending strength of 150 MPa which is usable as structural material. However, Sample No. 6 had the electric conductivity of $5 \times 10^{12}$ $\Omega \cdot cm$ in terms of volume specific resistance, which is greater than the desired upper limit electric conductivity, i.e., less than $10^{12}$ $\Omega \cdot cm$ in terms of volume specific resistance.

On the other hand, Sample Nos. 2 to 5 containing 80 to 93 weight percent of the compound oxide and 7 to 20 weight percent of the iron oxide had the electric conductivity of $10^7$ $\Omega \cdot cm$ or more but less than $10^{12}$ $\Omega \cdot cm$ in terms of volume specific resistance, which is in the desired electric conductivity range. Also, Sample Nos. 2 to 5 had the three-point bending strength of 100 MPa or more, which is sufficient for structural material.

Further, Sample Nos. 8 to 13 containing FeO as an electric conductivity provider and Sample No. 14 to 19 had similar relationships as shown in Tables 3 to 6.

EXAMPLE 2

Sample No. 20 was prepared by the following steps. Forsterite ($Mg_2SiO_4$), which is a compound of MgO and $SiO_2$, was prepared as a starting material. Iron oxide ($Fe_2O_3$) and zinc oxide (ZnO) were prepared as an electric conductivity providers. They were mixed with one another in the proportion shown in Table 7. The mixture was put into a specified chamber together with water or organic solvent and a binder, and was mixed for about 1 hour to obtain slurry. The slurry was dried with a spray dryer to prepare a secondary raw material in the form of a ball. The ball-shaped secondary raw material was compacted into a predetermined shape under a molding pressure of 1.0 ton/cm² by dry pressing, and then, was sintered at 1200 to 1300° C. in the atmospheric condition. As a result, semiconductive ceramics was obtained. The semiconductive ceramics was ground into a size of 60 mm in diameter and 2 mm in thickness. Consequently, Sample No. 20 was obtained.

Sample Nos. 21 to 30 were prepared in the same manner as Sample No. 20, except that the respective contents of the compound oxide and the iron oxide were changed as shown in Table 7.

The volume specific resistance, the thermal expansion coefficient, and the three-point bending strength of each sample were measured. In addition, the color of each sample was also observed. In Example 2, the three-point bending strength was measured by three-point bending test defined by the Japanese Industrial Standard or JIS. Samples which had an electric conductivity of $10^5$ $\Omega \cdot cm$ or more but less than $10^8$ $\Omega \cdot cm$ in terms of volume specific resistance, a thermal expansion coefficient of $11 \times 10^{-6}/°$ C. or less, and a three-point bending strength of 100 MPa re were evaluated to be good. Results of the evaluation shown in Table 8.

TABLE 7

| No. | Content (weight %) | | | Sintering Conditions | |
|---|---|---|---|---|---|
| | $2MgO \cdot SiO_2$ ($Mg_2SiO_4$) | $Fe_2O_3$ | ZnO | Temperature (° C.) | Hours |
| 20* | 40 | 5 | 55 | 1200 | 2 |
| 21 | 45 | 5 | 50 | 1200 | 2 |
| 22 | 50 | 5 | 45 | 1250 | 2 |
| 23 | 60 | 5 | 35 | 1250 | 2 |
| 24 | 65 | 5 | 30 | 1250 | 2 |
| 25 | 70 | 5 | 25 | 1250 | 2 |
| 26 | 65 | 30 | 5 | 1250 | 2 |
| 27 | 65 | 25 | 10 | 1250 | 2 |
| 28 | 45 | 50 | 5 | 1250 | 2 |
| 29* | 65 | 10 | 25 | 1250 | 2 |
| 30* | 40 | 50 | 5 | 1250 | 2 |

The *-added sample has a value outside the inventive range.

TABLE 8

| No. | Porosity (%) | Volume Specific Resistance ($\Omega \cdot cm$) | Thermal Expansion Coefficient (1/° C.) | Bending Strength (MPa) | Color |
|---|---|---|---|---|---|
| 20* | 5.0 | $9 \times 10^6$ | $10 \times 10^{-6}$ | 90 | Brown |
| 21 | 0.2 | $3 \times 10^6$ | $10 \times 10^{-6}$ | 110 | Brown |
| 22 | 0.1 | $4 \times 10^6$ | $10 \times 10^{-6}$ | 150 | Brown |
| 23 | 0.1 | $4 \times 10^6$ | $10 \times 10^{-6}$ | 150 | Brown |
| 24 | 0.1 | $8 \times 10^6$ | $10 \times 10^{-6}$ | 150 | Brown |
| 25 | 0.1 | $1 \times 10^7$ | $10 \times 10^{-6}$ | 150 | Brown |
| 26 | 0.1 | $1 \times 10^6$ | $10 \times 10^{-6}$ | 120 | Black |
| 27 | 0.1 | $5 \times 10^6$ | $10 \times 10^{-6}$ | 150 | Black |
| 28 | 0.1 | $1 \times 10^6$ | $10 \times 10^{-6}$ | 100 | Black |
| 29* | 0.1 | $1 \times 10^8$ | $10 \times 10^{-6}$ | 150 | Brown |
| 30* | 0.1 | $1 \times 10^8$ | $10 \times 10^{-6}$ | 90 | Black |

The *-added sample has a value outside the inventive range.

Table 8 shows that Sample Nos. 20 and 30 containing 60 weight percent of the electric conductivity providers of iron oxides ($Fe_2O_3$) and zinc oxide (ZnO) had an electric conductivity of $9 \times 10^6$ $\Omega \cdot cm$ or $1 \times 10^6$ $\Omega \cdot cm$ in terms of volume specific resistance, which is in the desired electric conductivity range. However, Sample Nos. 20 and 30 had a three-point bending strength of 90 MPa, which is less than the desired lower limit, i.e., 100 MPa. Accordingly, Sample Nos. 20 and 30 are not useable for structural material.

On the other hand, Sample Nos. 21 to 28 containing 30 to 55 weight percent of the electric conductivity providers of iron oxide ($Fe_2O_3$) and zinc oxide (ZnO) in total had a three-point bending strength of 100 MPa or more, and an electric conductivity of $10^5$ $\Omega \cdot cm$ or more but less than $10^8$ $\Omega \cdot cm$ in terms of volume specific resistance, which is the desired electric conductivity range, because the electric conductivity providers formed a continuous grain boundary phase.

However, in the case of Sample No. 29 containing 10 weight percent of iron oxide ($Fe_2O_3$) and 25 weight percent of zinc oxide (ZnO), 35 weight percent of the electric conductivity providers in total, although having a three-point bending strength of 150 MPa which is sufficient for structural material, Sample No. 29 had an electric conductivity of $1\times10^8$ Ω·cm in terms of volume specific resistance, which is beyond the desired upper limit. This seems to be due to the fact that there was no continuous grain boundary phase. It seems that the particular content of 10 weight percent of on oxide ($Fe_2O_3$) could have hindered the formation of continuous grain boundary phase.

Also, in the aspect of color of the inventive samples, Sample Nos. 26 to 28 containing iron oxide in more than 20 weight percent had a color of black while Sample Nos. 21 to 25 containing iron oxide 20 weight percent or less had a color of brown.

EXAMPLE 3

Sample Nos. 31 to 37 were prepared in the same manner as in Example 2 except that niobium oxide ($Nb_2O_3$) was used as an electric conductivity provider instead of zinc oxide (ZnO). Their respective contents are shown in Table 9. Further, the same measurements and color observation as those conducted in Example 2 were conducted. Results of the measurements and observation are shown in Table 10.

TABLE 9

| | Content (weight %) | | | Sintering Conditions | |
|---|---|---|---|---|---|
| No. | 2MgO.SiO$_2$ (Mg$_2$SiO$_4$) | Fe$_2$O$_3$ | Nb$_2$O$_3$ | Temperature (° C.) | Hours |
| 31* | 40 | 5 | 55 | 1200 | 2 |
| 32 | 45 | 5 | 50 | 1200 | 2 |
| 33 | 55 | 5 | 40 | 1250 | 2 |
| 34 | 65 | 5 | 30 | 1250 | 2 |
| 35 | 90 | 5 | 5 | 1250 | 2 |
| 36* | 40 | 55 | 5 | 1250 | 2 |
| 37* | 95 | 3 | 2 | 1250 | 2 |

The *-added sample has a value outside the inventive range.

TABLE 10

| No. | Porosity (%) | Volume Specific Resistance (Ω · cm) | Thermal Expansion Coefficient (1/° C.) | Bending Strength (MPa) | Color |
|---|---|---|---|---|---|
| 31* | 0.0 | 5 × 10$^5$ | 10 × 10$^{-6}$ | 80 | Gray |
| 32 | 0.0 | 8 × 10$^5$ | 10 × 10$^{-6}$ | 110 | Gray |
| 33 | 0.0 | 1 × 10$^6$ | 10 × 10$^{-6}$ | 150 | Gray |
| 34 | 0.0 | 4 × 10$^6$ | 10 × 10$^{-6}$ | 150 | Gray |
| 35 | 0.0 | 8 × 10$^6$ | 10 × 10$^{-6}$ | 150 | Gray |
| 36* | 0.1 | 1 × 10$^5$ | 10 × 10$^{-6}$ | 80 | Black |
| 37* | 0.1 | 1 × 10$^9$ | 10 × 10$^{-6}$ | 150 | Gray |

The *-added sample has a value outside the inventive range.

It could be seen in Tables 9 and 10 that Sample Nos. 31 and 36 containing 60 weight percent of iron oxide ($Fe_3O_3$) and niobium oxide ($Nb_2O_3$) in total had an electric conductivity of $5\times10^5$ Ω·cm in terms of volume specific resistance, which is in the desired electric conductivity range of $10^5$ Ω·cm or more but less than $10^8$ Ω·cm in terms of volume specific resistance. However, Sample Nos. 31 and 36 had a three-point bending strength of 80 MPa, which is insufficient for structural material requiring the three-point bending strength of 100 MPa or more.

Sample No. 37 containing 5 weight percent of iron oxide ($Fe_2O_3$) and niobium oxide ($Nb_2O_3$) in total had a three-point bending strength of 150 Mpa. However, Sample No. 37 had an electric conductivity of $1\times10^9$ Ω·cm in terms of volume specific resistance, which is beyond the desired upper limit of less than $10^8$ Ω·cm in terms of volume specific resistance.

On the other hand, Sample Nos. 32 to 35 containing 10 to 55 weight percent of iron oxide ($Fe_2O_3$) and niobium oxide ($Nb_2O_3$) in total had a three-point bending strength of 100 MPa or more, which is sufficient for structural material. Also, Sample Nos. 32 to 35 had an electric conductivity of $10^5$ Ω·cm or more but less than $10^8$ Ω·cm in terms of volume specific resistance, which is the desired range.

Also, it could be seen in Tables 9 and 10 that Sample Nos. 32 to 35 containing iron oxide in 20 weight percent or less and niobium oxide ($Nb_2O_3$) had a color of gray.

EXAMPLE 4

Sample Nos. 38 to 44 were prepared in the same manner as in Example 2 except that chromium oxide ($Cr_2O_3$) was used as an electric conductivity provider instead of zinc oxide (ZnO). Their respective contents are shown in Table 11. Further, the same measurements and color observation as those conducted in Example 2 were conducted. Results of the measurements and observation are shown in Table 12.

TABLE 11

| | Content (weight %) | | | Sintering Conditions | |
|---|---|---|---|---|---|
| No. | MgO.SiO$_2$ (Mg$_2$SiO$_4$) | Fe$_2$O$_3$ | Cr$_2$O$_3$ | Temperature (° C.) | Hours |
| 38* | 35 | 5 | 60 | 1500 | 2 |
| 39 | 45 | 5 | 50 | 1500 | 2 |
| 40 | 55 | 5 | 40 | 1500 | 2 |
| 41 | 65 | 5 | 30 | 1500 | 2 |
| 42 | 90 | 5 | 5 | 1300 | 2 |
| 43* | 40 | 55 | 5 | 1250 | 2 |
| 44* | 95 | 3 | 2 | 1250 | 2 |

The *-added sample has a value outside the inventive range.

TABLE 12

| No. | Porosity (%) | Volume Specific Resistance (Ω · cm) | Thermal Expansion Coefficient (1/° C.) | Bending Strength (MPa) | Color |
|---|---|---|---|---|---|
| 38* | 0.1 | 3 × 10$^5$ | 10 × 10$^{-6}$ | 80 | Brown |
| 39 | 0.1 | 3 × 10$^6$ | 10 × 10$^{-6}$ | 110 | Brown |
| 40 | 0.1 | 1 × 10$^6$ | 10 × 10$^{-6}$ | 150 | Brown |
| 41 | 0.1 | 1 × 10$^6$ | 10 × 10$^{-6}$ | 150 | Brown |
| 42 | 0.1 | 9 × 10$^6$ | 10 × 10$^{-6}$ | 150 | Gray |
| 43* | 0.1 | 1 × 10$^5$ | 10 × 10$^{-6}$ | 80 | Black |
| 44* | 0.1 | 1 × 10$^9$ | 10 × 10$^{-6}$ | 150 | Gray |

The *-added sample has a value outside the inventive range.

It could be seen in Tables 11 and 12 that Sample No. 38 containing 65 weight percent of iron oxide ($Fe_2O_3$) and chromium oxide ($Cr_2O_3$) in total had an electric conductivity of $3\times10^5$ Ω·cm in terms of volume specific resistance. The electric conductivity is in the desired electric conductivity range of $10^5$ Ω·cm or more but less than $10^8$ Ω·cm in terms of volume specific resistance. However, Sample No. 38 had a three-point bending strength of 80 MPa, which is insufficient for structural material requiring the three-point bending strength of 100 MPa or more.

Sample No. 44 containing 5 weight percent of iron oxide ($Fe_2O_3$) and chromium oxide ($Cr_2O_3$) in total had a three-point bending strength of 150 Mpa. However, Sample No.

44 had an electric conductivity of $1 \times 10^9$ Ω·cm in terms of volume specific resistance, which is beyond the desired upper limit of less than $10^8$ Ω·cm in terms of volume specific resistance.

On the other hand, Sample Nos. 39 to 42 containing 10 to 55 weight percent of iron oxide ($Fe_2O_3$) and chromium oxide ($Cr_2O_3$) in total had a three-point bending strength of 100 MPa or more, which is sufficient for structural material. Also, Sample Nos. 39 to 42 had an electric conductivity of $10^5$ Ω·cm or more but less than $10^8$ Ω·cm in terms of volume specific resistance, which is the desired range.

However, in the case of Sample No. 43 containing 60 weight percent of iron oxide ($Fe_2O_3$) and chromium oxide ($Cr_2O_3$) in total, although having an electric conductivity of $3 \times 10^5$ Ω·cm in terms of volume specific resistance, Sample No. 43 had a three-point bending strength of 80 MPa, which is insufficient for structural material requiring the three-point bending strength of 100 MPa or more.

In the aspect of color, Sample Nos. 39 to 41 containing chromium oxide in more than 15 weight percent had a color of brown while Sample No. 42 containing chromium oxide in 15 weight percent or less had a color of gray.

EXAMPLE 5

Sample Nos. 45 to 52 were prepared in the same manner as in Example 2 except that niobium oxide ($Nb_2O_3$) and/or chromium oxide ($Cr_2O_3$) were added in addition to iron oxide ($Fe_2O_3$) and zinc oxide (ZnO) as electric conductivity providers. Their specific contents are shown in Table 13. Also, the same measurements and color observation as those conducted in Example 2 were conducted. Results of the measurement and observation are shown in Table 14.

TABLE 13

| | Content (weight %) | | | | | Sintering Conditions | |
|---|---|---|---|---|---|---|---|
| No. | $2MgO·SiO_2$ ($Mg_2SiO_4$) | $Fe_2O_3$ | ZnO | $Nb_2O_3$ | $Cr_2O_3$ | Temperature (° C.) | Hours |
| 45* | 85 | 5 | 6 | 4 | 0 | 1300 | 2 |
| 46* | 85 | 5 | 6 | 0 | 4 | 1250 | 2 |
| 47 | 85 | 5 | 5 | 0 | 5 | 1300 | 2 |
| 48 | 80 | 5 | 5 | 5 | 5 | 1250 | 2 |
| 49 | 45 | 5 | 10 | 20 | 20 | 1350 | 2 |
| 50 | 85 | 5 | 0 | 5 | 5 | 1300 | 2 |
| 51* | 40 | 5 | 50 | 5 | 0 | 1250 | 2 |
| 52* | 40 | 5 | 5 | 45 | 5 | 1300 | 2 |

The *-added sample has a value outside the inventive range.

TABLE 14

| No. | Porosity (%) | Volume Specific Resistance (Ω · cm) | Thermal Expansion Coefficient (1/° C.) | Bending Strength (MPa) | Color |
|---|---|---|---|---|---|
| 45* | 0.1 | $1 \times 10^8$ | $10 \times 10^{-6}$ | 150 | Brown |
| 46* | 0.1 | $1 \times 10^8$ | $10 \times 10^{-6}$ | 150 | Brown |
| 47 | 0.1 | $9 \times 10^6$ | $10 \times 10^{-6}$ | 150 | Brown |
| 48 | 0.1 | $9 \times 10^6$ | $10 \times 10^{-6}$ | 150 | Dark Brown |
| 49 | 0.1 | $1 \times 10^6$ | $10 \times 10^{-6}$ | 150 | Gray |
| 50 | 0.1 | $8 \times 10^6$ | $10 \times 10^{-6}$ | 150 | Brown |
| 51* | 0.1 | $3 \times 10^6$ | $10 \times 10^{-6}$ | 90 | Brown |
| 52* | 0.1 | $9 \times 10^5$ | $10 \times 10^{-6}$ | 90 | Gray |

The *-added sample has a value outside the inventive range.

The following facts could be seen from Tables 13 and 14. Sample No. 45 containing 5 weight percent of iron oxide ($Fe_2O_3$), 6 weight percent of zinc oxide (ZnO), and 4 weight percent of niobium oxide ($Nb_2O_3$), 15 weight percent of electric conductivity providers in total, and Sample No. 46 containing 5 weight percent of iron oxide ($Fe_2O_3$), 6 weight percent of zinc oxide (ZnO), and 4 weight percent of chromium oxide ($Cr_2O_3$), 15 weight percent of electric conductivity providers in total, had a three-point bending strength of 150 MPa which is sufficient for structural material. However, Sample Nos. 45 and 46 had an electric conductivity of $1 \times 10^8$ Ω·cm in terms of volume specific resistance, which is beyond the desired upper limit of less than $10^8$ Ω·cm in terms of volume specific resistance, due to the absence of continuous grain boundary phase.

Sample Nos. 51 and 52, containing 60 weight percent of iron oxide ($Fe_2O_3$), zinc oxide (ZnO), chromium oxide ($Cr_2O_3$) and/or niobium oxide ($Nb_2O_3$) in total, had an electric conductivity of $3 \times 10^6$ Ω·cm and $9 \times 10^5$ Ω·cm in terms of volume specific resistance, which is in the desired electric conductivity range of $10^5$ Ω·cm or more but less than $10^8$ Ω·cm in terms of volume specific resistance. However, these samples had a bending strength of 90 MPa, which is insufficient for structural material requiring the bending strength of 100 MPa or more.

On the other hand, Sample Nos. 48 to 49 containing iron oxide ($Fe_2O_3$), zinc oxide (ZnO), niobium oxide ($Nb_2O_3$), and chromium oxide ($Cr_2O_3$) in a total content of more than 15 weight percent but 55 weight percent or less had an electric conductivity falling in the desired range of $10^5$ Ω·cm or more but less than $10^8$ Ω·cm in terms of volume specific resistance, and further a three-point bending strength of 100 MPa or more, which is sufficient for structural material.

Also, Sample No. 47 containing 5 weight percent of iron oxide ($Fe_2O_3$), 5 weight percent of zinc oxide (ZnO), and 5 weight percent of chromium oxide ($Cr_2O_3$), 15 weight percent of electric conductivity providers in total, and Sample No. 50 containing 5 weight percent of iron oxide ($Fe_2O_3$), 5 weight percent of niobium oxide ($Nb_2O_3$), and 5 weight percent of chromium oxide ($Cr_2O_3$), 15 weight percent of electric conductivity providers in total, had an electric conductivity falling in the desired range of $10^5$ Ω·cm or more but less than $10^8$ Ω·cm in terms of volume specific resistance, and further a three-point bending strength of 100 MPa or more, which is sufficient for structural material, owing to the presence of continuous grain boundary phase. It seems that the content of 5 weight percent of chromium oxide ($Cr_2O_3$), which is greater than the chromium oxide content of Sample Nos. 45 and 46, could be advantageous for formation of continuous grain boundary phase.

In the aspect of color of the inventive samples, Sample Nos. 47, 48, and 50, which contained iron oxide ($Fe_2O_3$) in 5 weight percent, niobium oxide ($Nb_2O_3$) in more than 5 weight percent but less than 10 weight percent, and zinc oxide (ZnO) and/or chromium oxide ($Cr_2O_3$), had a color of brown. Alternatively, Sample No. 49, which contained iron oxide ($Fe_2O_3$) in 5 weight percent, niobium oxide ($Nb_2O_3$) in 20 weight percent, and zinc oxide (ZnO) and/or chromium oxide ($Cr_2O_3$), had a color of gray.

As described above, semiconductive ceramics of the present invention has a desired electric conductivity and a sufficient mechanical strength required for structural material. Accordingly, the inventive semiconductive ceramics can be used in a variety of applications, such as electric charge removers, tools, jigs, holders, ceramics heaters, ceramics sensors, structure members for use in resistor substrate.

In particular, a magnetic disk substrate supporting member which is made of the inventive semiconductive ceramics has a thermal expansion coefficient near to that of the magnetic disk substrate, and can thus eliminate the likelihood that the magnetic disk substrate is subject to a strain or deformation due to a thermal expansion difference between the supporting member and the magnetic disk substrate when the substrate is rotated at a high speed. Also, the supporting member made of the inventive semiconductive ceramics can prevent accumulation of electric charges in the magnetic disk substrate more efficiently.

Further, the inventive semiconductive ceramics can be sintered and produced in the atmospheric condition. This enables the production manner to be simplified, thereby increasing the productivity and decreasing the production costs.

What is claimed is:

1. A supporting member for supporting a magnetic disk substrate, the supporting member being made of a semiconductive ceramic comprising a compound of MgO and $SiO_2$ as a main component, an iron oxide and at least one selected from the group consisting of a zinc oxide, a niobium oxide, and a chromium oxide, and having a three-point bending strength of 100 MPa or more and a thermal expansion coefficient of $11 \times 10^{-6}/°$ C. or less.

2. A supporting member according to claim 1, wherein the semiconductive ceramic includes crystals of $2MgO \cdot SiO_2$ and/or $MgSiO_3$, crystals of at least one selected from the group consisting of $MgFe_2O_3$, $MgFe_2O_4$, $Fe_2O_3$, and $Fe_3O_4$, and crystals of at least one selected from the group consisting of ZnO, $FeZnO_4$, $FeNbO_4$, $MgNb_2O_6$, $MgCr_2O_4$, $CrO_2$, and $Cr_2O_3$.

3. A supporting member according to claim 1, wherein the semiconductive ceramics has an electric conductivity of $10^5 \Omega \cdot cm$ or more but less than $10^8 \Omega \cdot cm$ in terms of volume specific resistance.

4. A supporting member according to claim 3, wherein the content of a compound is 42 to 90 weight percent, and the content of an iron oxide is 5 to 20 weight percent, and the remainder includes an zinc oxide and/or a chromium oxide, the semiconductive ceramic having a color of brown.

5. A supporting member according to claim 3, wherein the content of a compound is 42 to 90 weight percent, and the content of an iron oxide is 5 to 20 weight percent, and the remainder includes a niobium oxide or a chromium oxide, the semiconductive ceramic having a color of gray.

6. A supporting member according to claim 3, wherein the content of a compound is 42 to 90 weight percent, the content of an iron oxide is 5 to 20 weight percent, the content of a niobium oxide is 5 weight percent or more but less than 10 weight percent, and the remainder includes a zinc oxide and/or a chromium oxide, the semiconductive ceramic having a color of brown.

7. A supporting member according to claim 3, wherein the content of a compound is 42 to 90 weight percent, the content of an iron oxide is 5 to 20 weight percent, the content of a niobium oxide is 10 weight percent or more but less than 38 weight percent, and the remainder includes a zinc oxide and/or a chromium oxide, the semiconductive ceramic having a color of gray.

* * * * *